United States Patent [19]
Dent

[11] Patent Number: 5,619,533
[45] Date of Patent: Apr. 8, 1997

[54] CHANNEL-INDEPENDENT EQUALIZER DEVICE

[75] Inventor: Paul W. Dent, Stehags, Sweden

[73] Assignee: Ericsson Inc., Research Triangle Park, N.C.

[21] Appl. No.: 657,345

[22] Filed: Jun. 3, 1996

Related U.S. Application Data

[62] Division of Ser. No. 305,727, Sep. 14, 1994, Pat. No. 5,557,645.

[51] Int. Cl.$^6$ ................................................. H04L 25/03
[52] U.S. Cl. .............................. 375/232; 375/341; 371/43
[58] Field of Search ................................... 375/231, 232, 375/340, 341, 346, 348; 371/43

[56] References Cited

U.S. PATENT DOCUMENTS

| | | | |
|---|---|---|---|
| 5,119,400 | 6/1992 | Koch | 375/341 |
| 5,131,011 | 7/1992 | Bergmans et al. | 375/341 |
| 5,164,961 | 11/1992 | Gudmundson | 375/229 |
| 5,199,047 | 3/1993 | Koch | 375/343 |
| 5,263,033 | 11/1993 | Seshadri | 371/43 |
| 5,307,374 | 4/1994 | Baier | 375/341 |
| 5,331,666 | 7/1994 | Dent | 375/341 |
| 5,335,250 | 8/1994 | Dent et al. | 375/224 |
| 5,347,541 | 9/1994 | Iltis et al. | 375/230 |

FOREIGN PATENT DOCUMENTS

| | | |
|---|---|---|
| 425458 | 5/1991 | European Pat. Off. . |
| 594551 | 4/1994 | European Pat. Off. . |

OTHER PUBLICATIONS

Y.L. Branka et al., "Decoding of Convolutional Codes by Viterbi Blind Algorithm," *Communications on the Move*, Singapore ICCS/ISITA '92, pp. 877–881, Nov. 1992.

*Primary Examiner*—Young T. Tse
*Attorney, Agent, or Firm*—Burns, Doane, Swecker & Mathis

[57] ABSTRACT

A demodulator for demodulating a signal modulated with digital information symbols so as to extract the information symbols is disclosed. A receiver receives a signal over a communications channel. Samplers and digitizers then produce a sequence of numerical sample values representative of the received signal. Memories are provided each having a number of state memories each associated with a hypothesized symbol string. A controller selectively retrieves values from the memories and controls the timing of operations thereupon. A metric computer computes candidate metrics using a hypothesis of a next of the information symbols to be demodulated made by the controller, one of the numerical sample values, path metric values, B-matrices, and U-vectors and the candidate metrics associated state number selected by the controller from the memories. A best predecessor computer determines the best of the candidate metrics to be selected to be written back into the memory means along with a successor B-matrix, U-vector and path history. The successor B-matrices, U-vectors and path history are then updated using corresponding values associated with the best predecessor and one of numerical sample values.

2 Claims, 3 Drawing Sheets

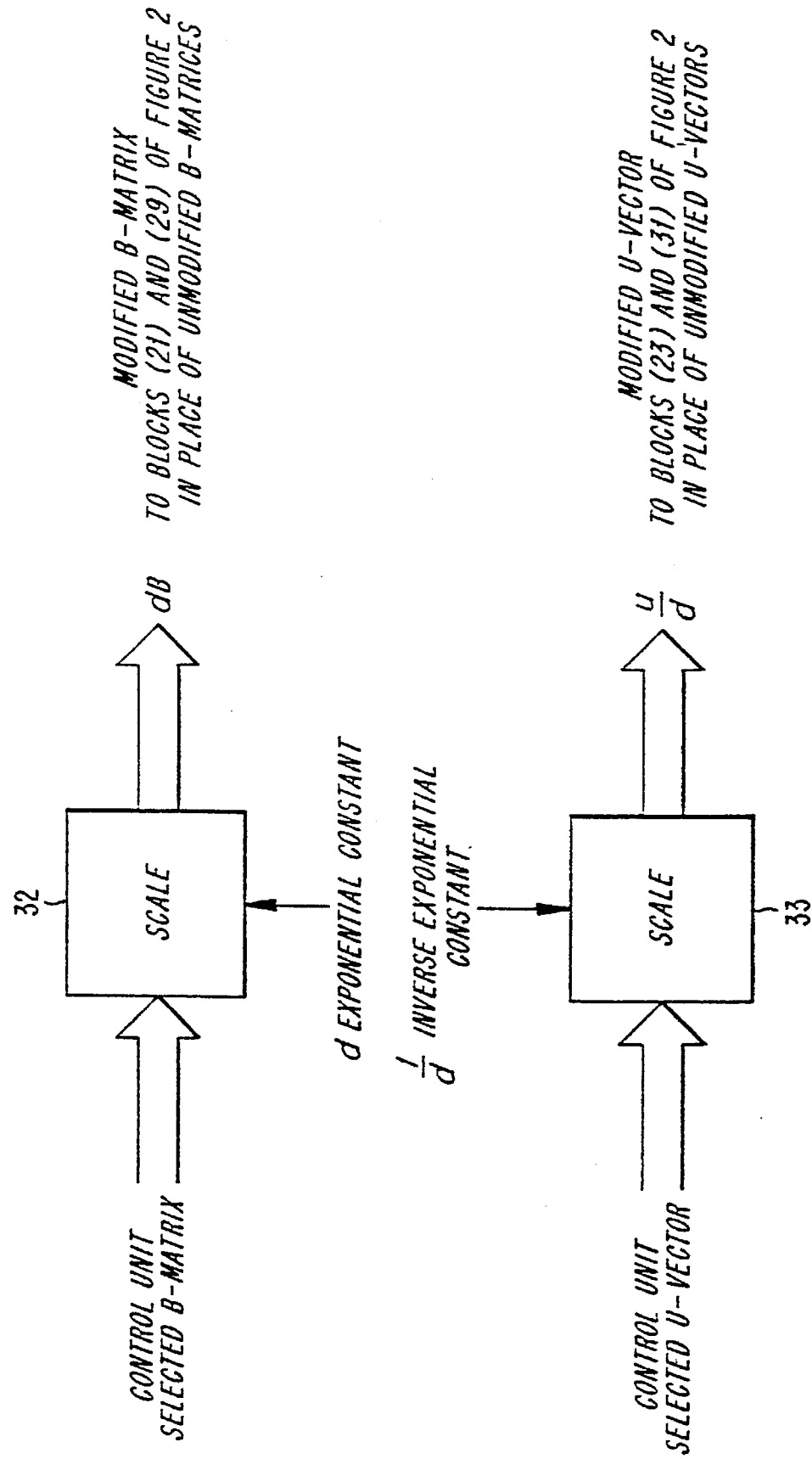

CHANNEL-INDEPENDENT EQUALIZER DEVICE

This application is a divisional of application Ser. No. 08/305,727, filed Sep. 14, 1994, now U.S. Pat. No. 5,557, 645.

FIELD OF THE INVENTION

The present invention relates to a method and apparatus for demodulating a digitally modulated radio signal that has passed through a channel suffering from constant or varying time dispersion, such as a cellular radio telephone signal. The present invention eliminates the need for a channel model by substituting a least-squares solution for the channel coefficients, which can be obtained in closed form.

BACKGROUND OF THE INVENTION

The term "Equalizer" is a generic term for a signal processing device that can demodulate or decode a signal while compensating for certain channel imperfections. The channel imperfections most usually corrected by an equalizer are unequal attenuation or phase in the channel at different frequencies covered by the signal. Echoes are a manifestation in radio propagation that can cause variations in attenuation and phase across a frequency band. When digital radio transmission is employed, echoes sometimes give rise to intersymbol interference (ISI), in which a received signal sample depends on more than one adjacent symbol, having been "mixed" together by delayed echoes or propagation paths with different delays.

One type of equalizer known in the prior art is the Finite Impulse Response (FIR), or Transversal equalizer. A FIR equalizer attempts to construct an inverse of the channel imperfections in order to correct the signal. The disadvantage with this type of equalizer becomes apparent when the equalizer attempts to replace signal frequency components that have been totally deleted by a notch in the channel. In this situation, the equalizer attempts to create infinite gain at that frequency which unduly emphasizes noise.

Another known type of equalizer is the Decision Feedback (DF) equalizer. The Decision Feedback equalizer subtracts a weighted version of the already-decoded symbols from the next signal sample to be decoded, intending thereby to cancel the echo of the just-decoded symbol. The disadvantage with this type of equalizer is that, in cellular radio propagation environments, a direct wave can fade temporarily leaving the echo as the main signal-bearing component. In this case, the echo should not be thrown away, as in the technique used in the Decision Feedback equalizer, but rather utilized.

When it can be identified that the main path has greater attenuation than a delayed echo path, it is possible to sample and store the signal in a memory as a sequence of samples, and then retrospectively process the signal in time-reversed sample sequence so that the echo is decoded and the weaker main path is suppressed. An adaptive change to the demodulation direction is disclosed in U.S. Pat. No. 5,335,250 and in U.S patent application Ser. No. 08/218,236, filed Mar. 28, 1994.

Also known in the prior art is the Viterbi equalizer. The Viterbi equalizer avoids the deficiencies of both the FIR and DF equalizers by not attempting to undo the channel distortions and by being insensitive to whether the shortest or delayed paths are dominant. Instead, the Viterbi equalizer uses a model of the channel or propagation paths that is applied to hypothesized symbol sequences to predict what should be received. The hypothesis that most closely matches the actually received signal is then retained. The Viterbi method can be regarded as looking ahead, wherein the current symbol is separately decided with all possible hypotheses for a limited number of future symbols. These multiple decisions are then gradually trimmed as equivalent decisions are made on the future symbols. In the prior art Viterbi equalizer, if the channel changes during a multi-symbol decoding sequence, the channel model must be updated accordingly. U.S. Pat. No. 5,164,961 discloses a Viterbi equalizer that has a separately updated channel model for each of the future hypothesized symbol combinations, wherein the choice of which channel model survives to be updated and used is made in connection with the equivalent decisions on the future symbols. U.S. Pat. No. 5,331,666 describes a version of the so-called "channel model per state" adaptive Viterbi equalizer that does not use an explicit channel model, but rather uses direct predictions of signal samples for different symbol hypotheses which are updated directly after the symbol hypotheses are trimmed in number, without going through the intermediate stage of a channel model.

The foregoing adaptive Viterbi equalizer requires an initial channel estimate. In the prior art, an initial channel estimate is formed with the help of known symbol groups included in the transmitted data. These symbol groups are called syncwords or equalizer training patterns. When the channel is not expected to change between training patterns, the initial estimate may be used without updating between training patterns. This can lead to a loss of performance as a trade-off against complexity, when the initial estimate is based only on a few known training symbols.

Another known equalizer is the so-called "Blind" equalizer. Blind equalizers are supposed to function without the benefit of an initial estimate based on known symbols. Many prior art blind equalizers have been conceived for decoding continuous data transmissions over telephone trunk lines, for example. However, in these systems it is of no consequence if the systems lose a few hundred or a thousand symbols while acquiring initial convergence.

SUMMARY OF THE INVENTION

The present invention relates to a device for demodulating a signal modulated with digital information symbols to extract the symbols. A receiving means receives a signal over a communication channel and a sampling and digitizing means produces a sequence of numerical sample values representative of the received signal. Memory means which have a number of state memories are disclosed wherein each state memory is associated with a hypothesized symbol string and each comprises a path metric memory, a B-matrix memory, a U-vector memory, and a path history memory. Control means selectively retrieves values from the memory means and controls the timing operations thereupon. Metric computing means computes candidate metrics using a hypothesis of the information symbols next to be demodulated made by the control means, one of the numerical sample values, path metric values, B-matrices, U-vectors and their associated state number selected by the control means from the memory means. Best predecessor computation means determines the best of the candidate metrics to be selected to be written back to the memory means along with a successor B-matrix, U-vector and path history. Finally, updating means calculates the successor B-matrices, U-vectors and path history using corresponding values associated with the best predecessor and one of the numerical sample values.

Another embodiment of the present invention is distinguishable over the prior art by being able to blindly equalize short bursts of data containing, in principle, no known symbols for providing a channel estimate without losing any data. All symbols are, in principle, demodulated with the same precision as the last symbol, where the maximum information has been received and used to extract clues as to the channel distortions. This behavior is obtained by mathematically eliminating the channel model by using estimates based on a hypothesis of the entire demodulated symbol sequence, respective estimates being used in testing the likelihood of their associated hypotheses.

BRIEF DESCRIPTION OF THE DRAWING

These and other features and advantages of the present invention will be readily apparent to one of ordinary skill in the art from the following written description, used in conjunction with the drawings, in which:

FIG. 3 illustrates a modification of the present invention for Exponential Forgetting.

DETAILED DESCRIPTION OF THE DISCLOSURE

Figure 1:
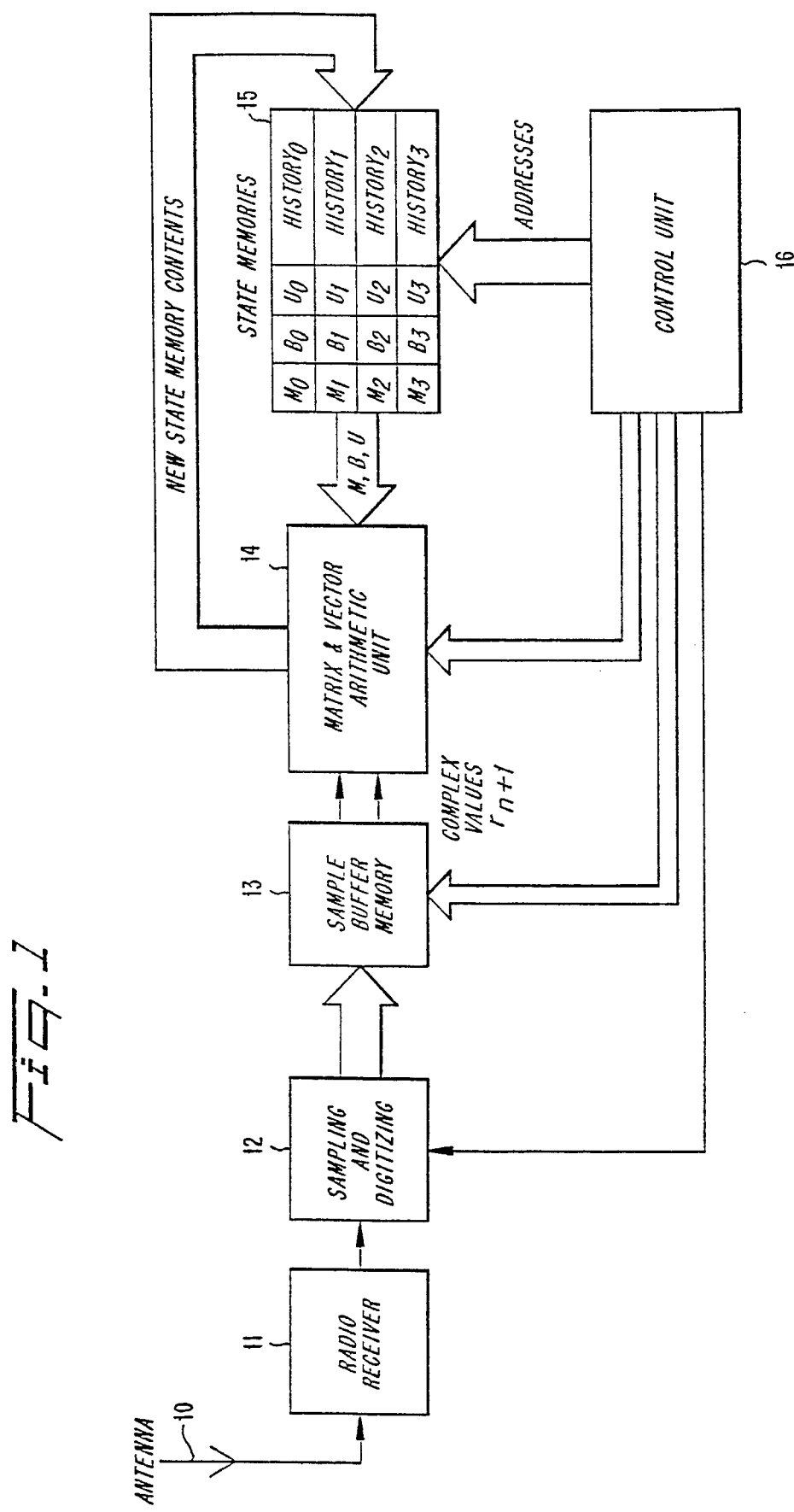
FIG. 1 illustrates a block diagram of one embodiment of the present invention.

The present invention is primarily intended for use in cellular communication systems, although it will be understood by those skilled in the art that the present invention can be used in other various communication applications.

A sequence of transmitted symbols is denoted by $s1, s2, s3 \ldots$ These symbols can take on binary values, such as $\pm 1$, quaternary values such as $\pm 1/\pm j$, or higher order modulation values.

Complex received samples $r1, r2, r3 \ldots$ taken one symbol time apart are assumed to depend linearly on the transmitted symbols through a set of channel echo coefficients $c1, c2, c3 \ldots cL$ according to the equation:

$$\begin{bmatrix} r1 \\ r2 \\ \cdot \\ \cdot \\ \cdot \end{bmatrix} = \begin{bmatrix} s(L), s(L-1), \ldots s1 \\ s(L+1), s(L), \ldots s2 \\ \ldots \\ \ldots \end{bmatrix} \begin{bmatrix} c1 \\ c2 \\ c3 \\ \cdot \\ \cdot \end{bmatrix}$$

This equation can be abbreviated as $Rn=Sn \cdot C$ where suffix n is the first n received samples included in R and likewise the matrix S has n rows and L columns.

The receiver's task is to find the sequence Sn that best explains the received waveform Rn. In addition, the channel coefficients may not be known by any other means other than by observing the received signal. Some constraints have to be placed on how rapidly the channel can vary. For example, the channel cannot be permitted to totally change between one symbol and the next, otherwise for any hypothesized symbol sequence, a set of varying channel coefficients could be found which would explain the received waveform. Therefore, the channel must be assumed to vary at a rate which is slower than the symbol rate.

A solution for the static channel case will now be described below. The errors between the expected waveform for a symbol sequence Sn and the received samples Rn are:

$$En = Sn \cdot C - Rn$$

The sumsquare error $En' \cdot En = C'Sn'SnC - C'Sn'Rn - Rn'SnC + Rn'Rn$ where "'" is a conjugate transpose. For a given sequence Sn, this sumsquare error may be minimized with respect to C by differentiating with respect to each C value and setting equal to 0. The set of simultaneous equations $Sn'SnC = Sn'Rn$ results, which can be rewritten as $$C = (Sn'Sn)^{-1} Sn'Rn$$

When this value for C is substituted in the sumsquare error equation, several terms cancel out leaving:

$$En'En = Rn'Rn - Rn'Sn(Sn'Sn)^{-1}Sn'Rn$$

Since Rn'Rn is not dependent on the choice of sequence Sn, the best sequence is simply that which maximizes the metric $Rn'Sn(Sn'Sn)^{-1}Sn'Rn$.

In principle, a large number of sequences Sn can be tried and the sequence which gives the largest value of the above expression can be selected. However, the calculation effort increases exponentially with the number of symbols n that are included in the optimization, just as in maximum likelihood sequence estimation before the discovery of the Viterbi algorithm, or in least squares fitting problems before the discovery of sequential least squares algorithms like Kalman. Therefore, a sequential algorithm for progressively extending the demodulation by one more symbol needs to be constructed.

By postulating a Viterbi-like machine that maintains a number of candidate sequences with associated scores or path metrics, it is an objective to find a way of extending these sequences by one extra symbol. It will now be explained below how one of these sequences is extended and its metric is updated. In this example, let $Bn=(Sn'Sn)^{-1}$, wherein Bn is a square matrix whose elements depend only on the hypothesized symbol sequence Sn. The term Bn refers to the matrix values after n symbols have been hypothesized. An expression for $B(n+1)$ in terms of Bn will now be developed. Sn is extended to $S(n+1)$ by the addition of a new row $$Zn - \{s(n+1), s(n), s(n-1) \ldots s(n-L+2)\}$$

Therefore $S'(n+1) \cdot S(n+1) = Sn'Sn + Zn'Zn$. Applying the matrix inversion lemma to this gives:

$$B(n+1) = [Sn'Sn + Zn'Zn]^{-1} = Bn - \frac{BnZn'ZnBn}{1 + ZnBnZn'}$$

In addition, the new product $R'(n+1)S(n+1)=Rn'Sn+r^*(n+1)Zn$ where $r(n+1)$ is the latest received sample. Substituting for $B(n+1)$ and $R'(n+1)S(n+1)$ the following expression for the metric is obtained:

$$[Rn'Sn + r^*(n+1)Zn] \left[ Bn - \frac{BnZn'ZnBn}{1+ZnBnZn'} \right] [Sn'Rn + r(n+1)Zn']$$

Multiplying this metric out gives eight terms which are listed below.

Term 1: $Rn'SnBnSn'Rn$, which is the previous metric Mn;

Term 2: $r^*(n+1)ZnBnSn'Rn$;

Term 3: $Rn'SnBnZn'r(n+1)$, note that terms 2 and 3 are complex conjugates of each other;

Term 4: $|r(n+1)|\ ZnBnZn'$;

Term 5:

$$\frac{-Rn'SnBnZn'ZnBnSn'Rn}{1+ZnBnZn'},$$

wherein in the numerator $Rn'SnBnZn'$ is a scalar and the other factors are its complex conjugate, therefore Term 5 can be written as:

$$\frac{-|Rn'SnBnZn'|^2}{1+ZnBnZn'};$$

Term 6:

$$\frac{-r(n+1)(ZnBnZn')(ZnBnSn'Rn)}{1+ZnBnZn'}, \text{ wherein}$$

the first of the bracketed numerator terms is also needed on the denominator and the second bracketed numerator term is the same as calculated for terms 2, 3 and 5;

Term 7:

$$\frac{-(Rn'SnBnZn')(ZnBnZn')r(n+1)}{1+ZnBnZn'},$$

which is the conjugate of Term 6;

Term 8:

$$\frac{r^*(n+1)(ZnBnZn')(ZnBnZn')r(n+1)}{1+ZnBnZn'} =$$

$$\frac{-|r(n+1)|^2(ZnBnZn')}{1+ZnBnZn'}$$

A computation strategy for the 8 terms is described below. First, $Un'=Rn'Sn$ is available from the foregoing iteration. The term $Un$ is a vector with a length equal to the number of symbols time dispersion, L. Then, $Zn$ is formed using the newest symbol $s(n+1)$ and $Vn=Bn\ Zn'$ is calculated which is also an L-element vector. The inverse $Bn$ is an L by L matrix available from the foregoing iteration. The complex scalar $a=Un'Vn$ and the real scalar $b=ZnVn$ are then calculated. As a result, $M(n+1) =$ $$\frac{Mn + 2(1-b)Re\{a \cdot r(n+1)\} + |r(n+1)|^2 - |a|^2}{1+b}$$

gives the new metric in terms of the old. The dimension of the matrix entities involved in these calculations is equal to the number of symbols time dispersion L that have to be handled, and does not grow with the number of symbols processed. Therefore the path metrics may be updated with constant effort per processed symbol, i.e., not exponentially increasing the effort as successive symbols are progressively decoded. In other words, the effort to decode 100 bits is just 10 times the effort to decode 10 bits. We also have to form:

$U'(n+1) = Un' + r^*(n+1)Zn$, and $$B(n+1) = Bn - \frac{VnVn'}{1+b}$$

for use in the next iteration.

The above metric update has to be performed for each candidate sequence $Sn$ and for each possible value of the newest symbol $s(n+1)$. This results in an exponentially expanding tree of possible sequences that has to be trimmed. The Viterbi algorithm chooses to retain the best of all sequences that agree in their last q symbols, thus restricting the number of retained states to $2^q$ in a binary modulation system. An alternative would be to retain only the best K states. It may be realized that sequences differing only in sign, or in a symbol phase rotation give the same result, and thus corresponds to the demodulation ambiguity when no absolute phase reference is provided. This ambiguity has to be resolved either by differential decoding after demodulation, or by including known polarity symbols in the transmitted data to constrain the allowable sequences.

Unlike the prior art methods, the present method places no limit on the number of sequence postulates that can usefully be retained for further likelihood testing, since the result at each iteration depends not only on the number of symbols in the finite channel impulse response length but also on the implied channel estimation over the whole of the sequence to date. The structure of an apparatus for carrying out the above demodulation algorithm will be described below. The present example uses a 4-ary phase modulation system such as QPSK or Pi/4-QPSK which is used in the U.S. digital cellular system. One symbol-period's time dispersion is to be allowed for, so that the channel has two terms and thus L=2. The Bn matrices are thus 2×2 and multiply Zn's consisting of one old symbol and one new symbol. Therefore a 4-state machine is postulated in which all four possibilities of the preceding symbol are retained.

The internal values in a Viterbi processor may thus be structured as follows:

| SYMBOL HISTORY | STATE | B-matrices | U-vectors | PATH METRIC |
|---|---|---|---|---|
| 013201032001321 | 0 | Bo | Uo | Mo |
| 132103201032023 | 1 | B1 | U1 | M1 |
| 320103201032321 | 2 | B2 | U2 | M2 |
| 221302102201132 | 3 | B3 | U3 | M3 |

The operation of the apparatus will now be described. With state 0 as predecessor and a new symbol 0, the just received sample $r(n+1)$ is used to calculate a new Mo metric. This is repeated for states 1, 2 and 3 as predecessors and the predecessor which gives the largest new Mo metric is selected to be the predecessor to new state 0. The associated B matrix and U vector are updated to be the new Bo and Uo, and the associated symbol history is copied to new state 0, left shifting in the selected predecessor's state number. This is repeated using new symbol postulates of 1, 2 and then 3 to generate new states 1, 2 and 3.

When the channel is time-varying, it is not valid to substitute a least squares estimate of the channel C calculated over the entire symbol history. One solution would be to estimate the channel over a moving block of symbols and substitute that. According to one embodiment of the present invention, the same algorithm described above can be used, if the B matrix is updated by adding the influence of the latest symbol while subtracting the influence of the oldest symbol in the block. The U-vectors are updated in the same way.

When the channel is expected to vary so rapidly that the number of symbols in such a block window is small, for example 5, there are only 32 possible B matrices (in the binary case) and all of these matrices may be precomputed and stored, thus avoiding the need to update B matrices at all.

A second solution for time-varying channels is to compute the channel with exponential de-emphasis of older errors. A solution for the channel that minimizes the sum of the squares of errors $E_i$ is given by:

$$\left[ [s(L+i-1), s(L+i-2) \ldots si] \begin{bmatrix} c1 \\ c2 \\ . \\ . \\ cL \end{bmatrix} - r(i) \right] EXP((i-n)T)$$

Thus the latest error (i=n) is not down-weighted, while errors occurring q symbols before are down-weighted by EXP(-qT).

Taking the exponential weights inside the bracket and applying them to the rows of S and the r-values, a modified S matrix is obtained in which the last row is weighted by 1, and is thus unchanged, but in which earlier rows are progressively down-weighted by EXP(-qT). The new R-vector also has an unchanged last element r(n) and exponentially down-weighted earlier elements. With this modified S-matrix and R-vector, the solution for the channel which minimizes the sumsquare error over i-1 to n is still given by:

$$Cn = (Sn'Sn)^{-1} Sn'Rn$$

The R vector is now however updated by means of:

$$R(n+1) = \begin{bmatrix} d \cdot Rn \\ r(n+1) \end{bmatrix}$$

where d=EXP(-T).

That is, the R vector is extended to n+1 elements by de-weighting the previous elements by d and appending the new received sample r(n+1).

The S-matrix is updated by means of:

$$S(n+1) = \begin{bmatrix} d \cdot Sn \\ \overline{s(L+n-1), s(L+n-2) \ldots s(n)} \end{bmatrix}$$

In other words, the S-matrix is extended by a new row, previously denoted by Zn, while the previous rows are downweighted by d. Thus:

$$S(n+1)'S(n+1) = Exp(-2T)Sn'Sn + Zn'Zn$$

giving the recursion formula for B(n+1) as:

$$Bn \leftarrow Bn/d^2$$

Then $$B(n+1) = Bn - \frac{BnZn'ZnBn}{1 + ZnBnZn'}$$

The recursion formula for the vector previously defined as Un becomes:

$$Un' \Leftarrow d^2 \cdot Un'$$

$$U'(n+1) = Un' + r^*(n+1) \cdot Zn$$

Other than the above modifications for updating Un and Bn, no other changes to the algorithm are needed to cope with time-varying channels. Note that the augmentation of Bn by EXP(2T) and the reduction of Un by EXP(-2T) should be done as the very first step, so that the algorithm for varying channels becomes:

i) calculate $Un = d \cdot Un$ where $d = EXP(-2T)$
ii) calculate $Bn = Bn/d$
iii) form Zn using the newest symbol s(n+1) and Calculate $Vn = Bn \, Zn$
iv) calculate $a = Un'Vn$ and $b = ZnVn$ Then $$M(n+1) = \frac{Mn + 2(1-b)Re\{a \cdot r(n+1)\} + |r(n+1)|^2 - |a|^2}{1+b}$$

v) $U'(n+1) = Un' + r^*(n+1)Zn$ vi) $B(n+1) = Bn - \frac{VnVn'}{T+b}$

The exponential forgetting factor d in the above equations should be chosen according to how rapidly the channel can vary. The optimum value of d for a given rate of change of channel can be established by simulation.

Figure 2:
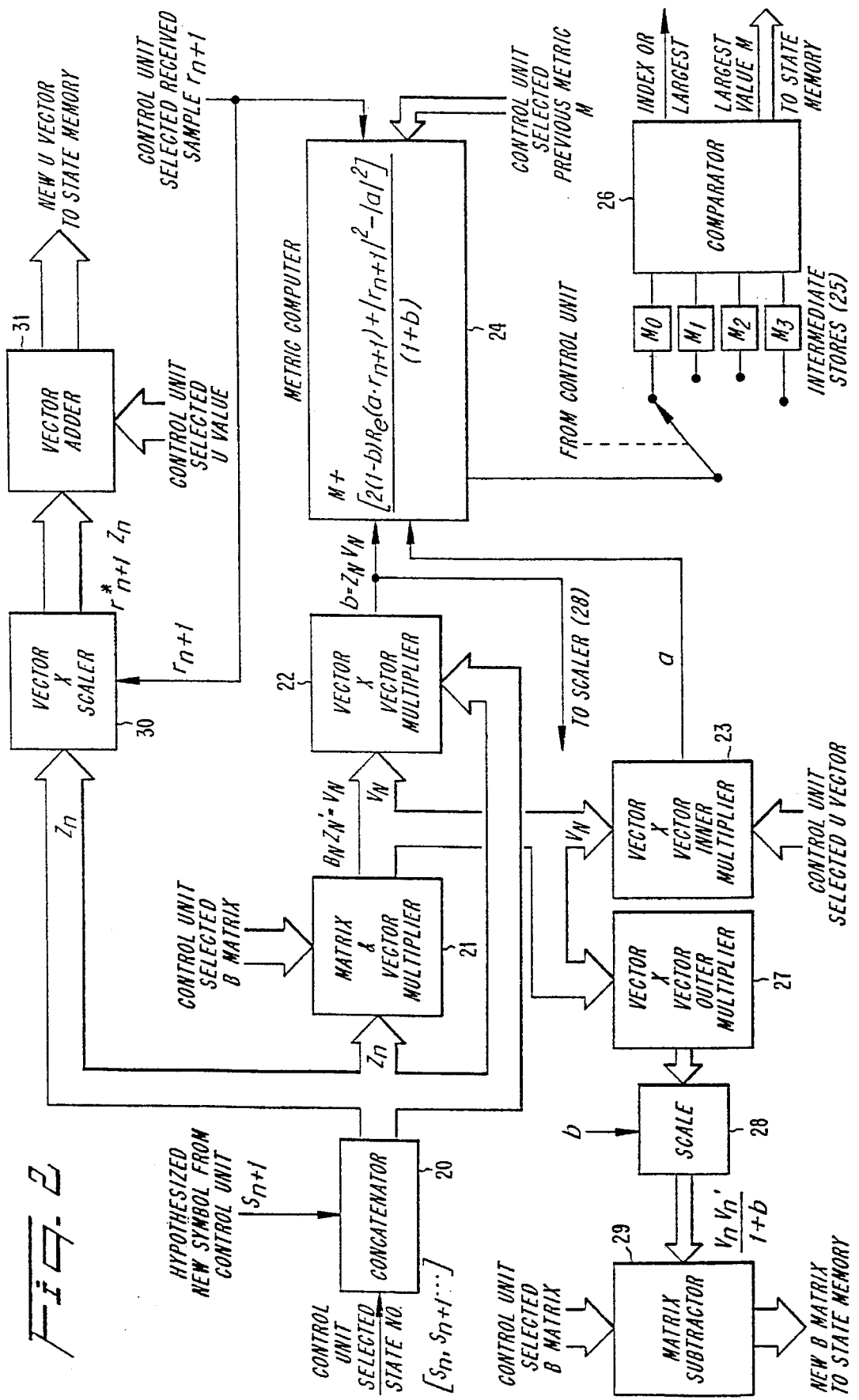
FIG. 2 illustrates a Matrix and Vector arithmetic unit according to one embodiment of the present invention.

One embodiment of the present invention is illustrated in FIGS. 1 to 3. FIG. 1 shows a radio receiver 11 which receives a signal from an antenna 10. Alternatively, the radio receiver can be connected to a telephone line. Furthermore, the radio receiver can be located in a cellular radio telephone subscriber unit or a cellular radio network base station. The radio receiver filters, amplifies and converts the received signal to a suitable frequency and form for digitization in a sampling and digitizing unit 12. The numerical samples representative of the complex number-value of the instantaneous radio signal are buffered in a sample buffer memory 13. As a result, the samples can be selectively retrieved under the control of a control unit 16. A collection of state memories 15 includes, for each state, a path metric memory element, a B-matrix memory element, a U-vector memory element and a path history memory. The path history memory for each state contains a symbol string of previously hypothesized symbols that will become the output of the device if the associated path metric is at some point judged to be the largest.

The control unit 16 can select the contents of each state memory in turn to be applied to the metric computer 14 along with a selected signal sample retrieved from the buffer memory 13. The control unit 16 also informs the metric computer of the state number selected, which corresponds to each as-yet unresolved hypothesis of sequential symbol combinations not yet archived into the state's path history memory. For example, if only one outstanding unresolved symbol hypothesis is permitted in the device (i.e., the device is configured to deal with one symbol-period delayed echoes only), and the symbol is a binary bit, there will be only two state memories and the control unit will just inform the metric computer whether the "1" state or "0" state is currently selected. If the symbol is quaternary, four states will exist and the control unit 16 will inform the metric computer 14 whether symbol 0,1,2 or 3 is selected. If two outstanding unresolved quaternary symbols are permitted, corresponding to the device being configured to deal with up to 2 symbol-period delayed echoes, then the control unit 16 informs the metric computer 14 which of the 16 states 00,01,02,03,10,11,12,13,20,21,22,23,30,31,32 or 33 is currently selected. The metric computer 14 actually requires the complex values that the transmitter transmitted for these symbols. It is immaterial whether the control unit 16 supplies the complex values directly to the metric computer, or whether the metric computer converts symbols into complex values using a model of the transmit modulation process. For example, if the transmit modulation process is QPSK, in which symbols are represented by a complex vector of constant length and phase angle 45°, 135°, −45° or −135° then the complex values corresponding to quaternary symbols 0,1,2 and 3 are $$(1+j)/\sqrt{2}, (-1+j)/\sqrt{2}, (1-j)/\sqrt{2} \text{ and } (-1-j)/\sqrt{2},$$

respectively. These are the S-values used in the above calculations.

The matrix and vector arithmetic unit 14 computes a new metric for a given new symbol hypothesis and each of the previous states selected in turn. The largest of the new values is selected to be the new metric value of the state the new symbol hypothesis will be associated with as a new unresolved symbol. Selecting the largest of the new metric values resolves the oldest of the previously unresolved symbol hypotheses and this resolved symbol is then shifted into the associated path history memory. Thus, one new unresolved symbol is created at each iteration of the device while one old hypothesis is resolved, so that the number of unresolved symbols remains constant and the number of states remains constant.

In addition to calculating a new metric value for each of the new states, the matrix and vector arithmetic unit 14 calculates a new B-matrix and U-vector for each new state. The new B and U elements are calculated using the elements of corresponding entities from that old state which gave rise to the largest metric that was selected for the new state.

The signal flow within the matrix and vector arithmetic unit 14 is shown in FIG. 2. A concatenator 20 forms a vector Zn out of the complex values associated with currently unresolved symbols (Sn,S(n−1) . . . ) of the control-unit-selected state, plus a new unresolved symbol S(n+1). The vector Zn is simply (S(n+1),Sn,S(n−1) . . . )

The complex conjugate of Zn is multiplied by the control-unit-selected B-matrix in a multiplier 21 to generate a new vector Vn. The vector Vn is then multiplied by the Zn vector again in the multiplier 22 to yield the scalar signal "b" used in a metric computer 24. The vector Vn is also multiplied by a control-unit-selected U-vector in a multiplier 23 to yield a second scalar quantity "a", also applied to the metric computer 24. The other values used in the metric computer are also scalars, namely the current, control-unit-retrieved signal sample r(n+1) from buffer memory 13 and the control-unit-selected path metric value M. The metric computer 24 combines these values to produce a new metric with the control unit selecting the M,B, and U entities from each state of the state memory. The results are temporally stored in a temporary storage 25 so that they can be compared in a comparator 26 to find the largest value. The state that gives rise to the largest value and the largest value are determined by the comparator 26. This is called a best predecessor state. This resolves the oldest of the unresolved symbol hypotheses to be associated with the state with which the new symbol hypothesis S(n+1) will be associated. This is called the successor state. The resolved symbol is appended to the other symbols in the path history of the best predecessor to become the path history of the successor.

In addition, the B and U entities of the best predecessor are updated to become the B and U entities of the successor state. The updating is carried out by blocks (27–31) of FIG. 2. The block 27 performs outer multiplication of the vector Vn with its own conjugate transpose to form a square matrix. This is scaled by 1/(1+b) in a scaler 28 using the b-value computed by the multiplier 22, then subtracted from the predecessor state's B matrix to obtain the successor state's B-matrix.

The successor state's U-vector is computed by a multiplier 30 and an adder 31. The Zn vector from the concatenator 20 is multiplied by the complex conjugate of the selected received signal sample r(n+1) in the multiplier 30. The result is then added to the predecessor state's U-vector to form the successor state's U-vector in the adder 31.

When the control unit has completed the above processing for all new symbol hypotheses, the set of new state memory contents (successor states) become the state memory contents for beginning a new processing cycle to decode signal sample r(n+2).

The above described process exhibits ever-decreasing B-matrices and ever-increasing U-vectors. This is appropriate if the channel imperfections (e.g., echoes or time-dispersion) are non-varying. However, if the channel is varying, exponential down-weighting of past history is more appropriate, and this can be applied merely by modifying B-matrices and U-vectors before use, as illustrated in FIG. 3. FIG. 3 shows two new scaling units 32 and 33 that modify the control-unit-selected B matrices and U-vectors respectively before use in FIG. 2. The B-matrices are increased by the factor d, while the U-vectors are decreased by the same factor. This inhibits the ever-decreasing behavior of the B-matrices and the ever-increasing behavior of the U-vectors that occurs without exponential forgetting. As a result, the present invention tolerates channel variations and resolves decoded symbols based more on recently processed signal samples than on long past processed signal samples. It may also be realized that "most recently processed" is not necessarily the same as "most recently received", since the use of a buffer memory allows received samples to be processed in time reversed order, or even half in time reversed order and half in non-time-reversed order from a central starting point.

In addition, other means for adapting the device to the varying channel case may be employed, corresponding to the Kalman formulation of sequential least squares processing as compared with sequential least squares processes with exponential forgetting. These differ only in how the B-matrices are prevented from continually decreasing. In the Kalman approach, a constant Q-matrix is added to the B-matrices as a pre-modification before use. All such least squares formulations can be implemented by the present invention and are selected according to how the channel is expected to vary. Performance simulation can be used to determine which approach to use and to determine the optimum d-values or Q-matrix values for a particular type of channel.

The arithmetic units illustrated in the blocks of FIGS. 1–3 should preferably be simplified to the maximum extent by noting whether values are purely real instead of complex and not generating an imaginary part if the values are real. Also, the symbol values for binary modulation are just real and +or −1, allowing great simplification of multipliers 21, 22 and 30. Even when the quaternary symbols of QPSK as mentioned above are used, the common factor of $1/\sqrt{2}$ between the real and imaginary parts can be removed leaving only values of +1 and −1, that again allows large simplifications of multipliers 21, 22 and 30. The construction of the present invention is however applicable for decoding any representation of digital data by modulating amplitude or phase values of a radio signal or both. It may also be appreciated that the present invention can be applied to the decoding of digital data signals that have been received over a telephone line.

It will be appreciated that a person skilled in the art can devise many variations in the detailed implementation of the invention, including the use of programmable signal processors or stored-program arithmetic devices to perform the necessary arithmetic. All such variations are considered to be within the scope of the invention as laid out in the following claims.

I claim:

1. A blind equalizing apparatus for demodulating information-symbol-bearing signals received through a communications channel with unknown echoes or time-dispersion, comprising:

a sequential maximum likelihood processor having a number of state memories each equipped with:
a path history memory,
a path metric memory, and
a first memory for a plurality of adaptive values;

path metric computing means for computing new path metric values using old path metric values, said adaptive values, and a latest sample of the received signals; and adapting means for adapting said adaptive values such mat each of said new metric values is substantially equal in value to one of said old metric values plus an increment based on the latest received sample, wherein said old metric values have been calculated with the benefit of information contained in the latest received signal sample.

2. The equalizing apparatus according to claim 1, wherein said sequential maximum likelihood processor is a Viterbi processor.

\* \* \* \* \*